US009880605B2

(12) United States Patent
Thangaraj et al.

(10) Patent No.: US 9,880,605 B2
(45) Date of Patent: Jan. 30, 2018

(54) METHOD AND SYSTEM FOR THROTTLING POWER CONSUMPTION

(71) Applicant: SanDisk Technologies LLC, Plano, TX (US)

(72) Inventors: Senthil M. Thangaraj, Fremont, CA (US); Divya Reddy, Milpitas, CA (US); Satish Babu Vasudeva, Fremont, CA (US); Rakesh Chandra, San Jose, CA (US); Rodney Brittner, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 150 days.

(21) Appl. No.: 14/668,722

(22) Filed: Mar. 25, 2015

(65) Prior Publication Data

US 2016/0116968 A1  Apr. 28, 2016

Related U.S. Application Data

(60) Provisional application No. 62/069,268, filed on Oct. 27, 2014.

(51) Int. Cl.
G06F 3/06 (2006.01)
G06F 1/32 (2006.01)

(52) U.S. Cl.
CPC .......... G06F 1/3221 (2013.01); G06F 3/0625 (2013.01); G06F 3/0634 (2013.01);
(Continued)

(58) Field of Classification Search
None
See application file for complete search history.

(56) References Cited

U.S. PATENT DOCUMENTS 5,493,196 A  2/1996 Feldstein
5,714,869 A  2/1998 Tamechika et al.
(Continued)

FOREIGN PATENT DOCUMENTS

EP  0 878 755 A1  11/1998
EP  2 602 707 A2  6/2013
WO  WO 2010/116349  10/2010

OTHER PUBLICATIONS

International Search Report and Written Opinion dated Dec. 15, 2015, received in International Patent Application No. PCT/US2015/053641, which corresponds to U.S. Appl. No. 14/668,710, 12 pages (Thangaraj).

(Continued)

Primary Examiner — Charles Rones
Assistant Examiner — Hewy Li
(74) Attorney, Agent, or Firm — Brinks Gilson & Lione

(57) ABSTRACT

Systems, methods, and/or devices are used to manage a storage system. In one aspect, the method includes receiving, from a host to which a storage device of the storage system is operatively coupled, a request to perform a first memory operation on one or more memory devices of the storage device. The method includes determining a count of credits corresponding to the first memory operation. If a current count of credits in the first credit pool is greater than or equal to the count of credits corresponding to the first memory operation and a current count of credits in the second credit pool is greater than or equal to the count of credits corresponding to the first memory operation, the method includes: performing the first memory operation; and decrementing the first and second credit pools according to the count of credits corresponding to the first memory operation.

22 Claims, 6 Drawing Sheets

(52) U.S. Cl.
CPC .......... *G06F 3/0659* (2013.01); *G06F 3/0679* (2013.01); *G06F 3/0688* (2013.01); *Y02B 60/1246* (2013.01)

(56) References Cited

U.S. PATENT DOCUMENTS

| | | | |
|---|---|---|---|
| 6,035,347 | A | 3/2000 | Beardsley et al. |
| 6,172,573 | B1 | 1/2001 | Lim |
| 8,725,931 | B1 | 5/2014 | Kang |
| 8,751,836 | B1 | 6/2014 | Piszczek et al. |
| 8,788,779 | B1* | 7/2014 | Horn ................ G06F 3/0616 711/103 |
| 8,938,630 | B2* | 1/2015 | Jeddeloh ............ G06F 1/3234 710/24 |
| 2001/0011319 | A1 | 8/2001 | Beppu |
| 2004/0021444 | A1 | 2/2004 | Peschke |
| 2004/0130299 | A1 | 7/2004 | Pietkiewicz et al. |
| 2004/0267409 | A1 | 12/2004 | De Lorenzo et al. |
| 2005/0108491 | A1 | 5/2005 | Wong et al. |
| 2005/0204175 | A1 | 9/2005 | Burton |
| 2005/0210304 | A1* | 9/2005 | Hartung ............ G06F 1/3268 713/320 |
| 2008/0005410 | A1 | 1/2008 | Mies et al. |
| 2008/0005511 | A1* | 1/2008 | Laudon ............ G06F 13/1668 711/163 |
| 2008/0098242 | A1* | 4/2008 | Peterson ............ G06F 9/3802 713/320 |
| 2009/0171513 | A1 | 7/2009 | Tsukazawa |
| 2010/0049905 | A1 | 2/2010 | Ouchi |
| 2011/0122691 | A1 | 5/2011 | Sprouse |
| 2011/0191666 | A1 | 8/2011 | Decker et al. |
| 2011/0239009 | A1 | 9/2011 | Noda |
| 2011/0314312 | A1* | 12/2011 | Naffziger ........... G06F 1/3203 713/323 |
| 2012/0023346 | A1 | 1/2012 | Byom et al. |
| 2012/0159057 | A1 | 6/2012 | Loh et al. |
| 2012/0290864 | A1 | 11/2012 | Seroff |
| 2012/0331207 | A1 | 12/2012 | Lassa et al. |
| 2012/0331282 | A1 | 12/2012 | Yurzola et al. |
| 2013/0080679 | A1 | 3/2013 | Bert |
| 2013/0275781 | A1 | 10/2013 | Ramage et al. |
| 2013/0305008 | A1 | 11/2013 | Kwon et al. |
| 2014/0304560 | A1 | 10/2014 | Narasimha et al. |
| 2015/0033045 | A1* | 1/2015 | Raghuvanshi ........ G06F 1/3234 713/320 |
| 2015/0169021 | A1* | 6/2015 | Salessi ................ G06F 1/266 713/300 |
| 2015/0323976 | A1 | 11/2015 | Chen et al. |
| 2016/0062421 | A1 | 3/2016 | Sugawara et al. |
| 2016/0085458 | A1 | 3/2016 | Skandakumaran et al. |
| 2016/0117105 | A1 | 4/2016 | Thangaraj et al. |

OTHER PUBLICATIONS

International Search Report and Written Opinion dated Dec. 14, 2015, received in International Patent Application No. PCT/US2015/053644, which corresponds to U.S. Appl. No. 14/668,722, 12 pages (Thangaraj).
Internation Search Report and Written Opinion dated Jul. 14, 2015, received in International Patent Application No. PCT/US2015/027265, which corresponds to U.S. Appl. No. 14/572,619, 10 pages (Ellis).
International Search Report and Written Opinion dated Feb. 11, 2016, received in International Patent Application No. PCT/US2015/053549 which corresponds to U.S. Appl. No. 14/572,633, 13 pages (Ellis).
Gurumurthi, S. et al., "Disk Drive Roadmap from the Thermal Perspective: A Case for Dynamic Thermal Management", *IEEE Computer Society*, vol. 33, No. 2, 2005, 12 pages.
Nguyen, T. et al., "Trade-Off Between Sample Size and Accuracy: Case of Measurements Under Interval Uncertainty", *International Journal of Approximate Reasoning*, vol. 50, 2009, pp. 1164-1176.
Office Action in U.S. Appl. No. 14/668,710, dated Sep. 1, 2016, 27 pages.
Office Action in U.S. Appl. No. 14/668,710, dated May 4, 2017, 20 pages.

* cited by examiner

METHOD AND SYSTEM FOR THROTTLING POWER CONSUMPTION

RELATED APPLICATIONS

This application claims priority to U.S. Provisional Application No. 62/069,268, filed Oct. 27, 2014, which is hereby incorporated by reference in its entirety.

TECHNICAL FIELD

The disclosed embodiments relate generally to memory systems, and in particular, to limiting the power consumed by a storage device (e.g., comprising one or more flash memory devices).

BACKGROUND

Semiconductor storage systems are commonly used for storing and managing data for electronic devices. A typical non-volatile data storage system stores data as an electrical value in the memory cells of the storage system and memory controllers are generally tasked with managing data transactions across multiple memory devices of the storage system.

Data transactions in data storage systems are generally carried out by executions of memory operations or commands. To facilitate this process, memory controllers are often constructed with command queues that help optimize command executions across multiple memory cells. Multiple commands executed in parallel across the data storage system, however, can result in spikes in power consumption.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to manage a storage system with a storage device including one or more memory devices. In one aspect, a storage controller of the storage device is configured to perform operations with/on the one or more memory devices (e.g., flash memory device(s)). In some embodiments, the storage controller throttles the power consumed by the storage device according to a first credit pool (e.g., corresponding to peak power) and a second credit pool (e.g., corresponding to average power), where the first and second credit pools are tunable.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
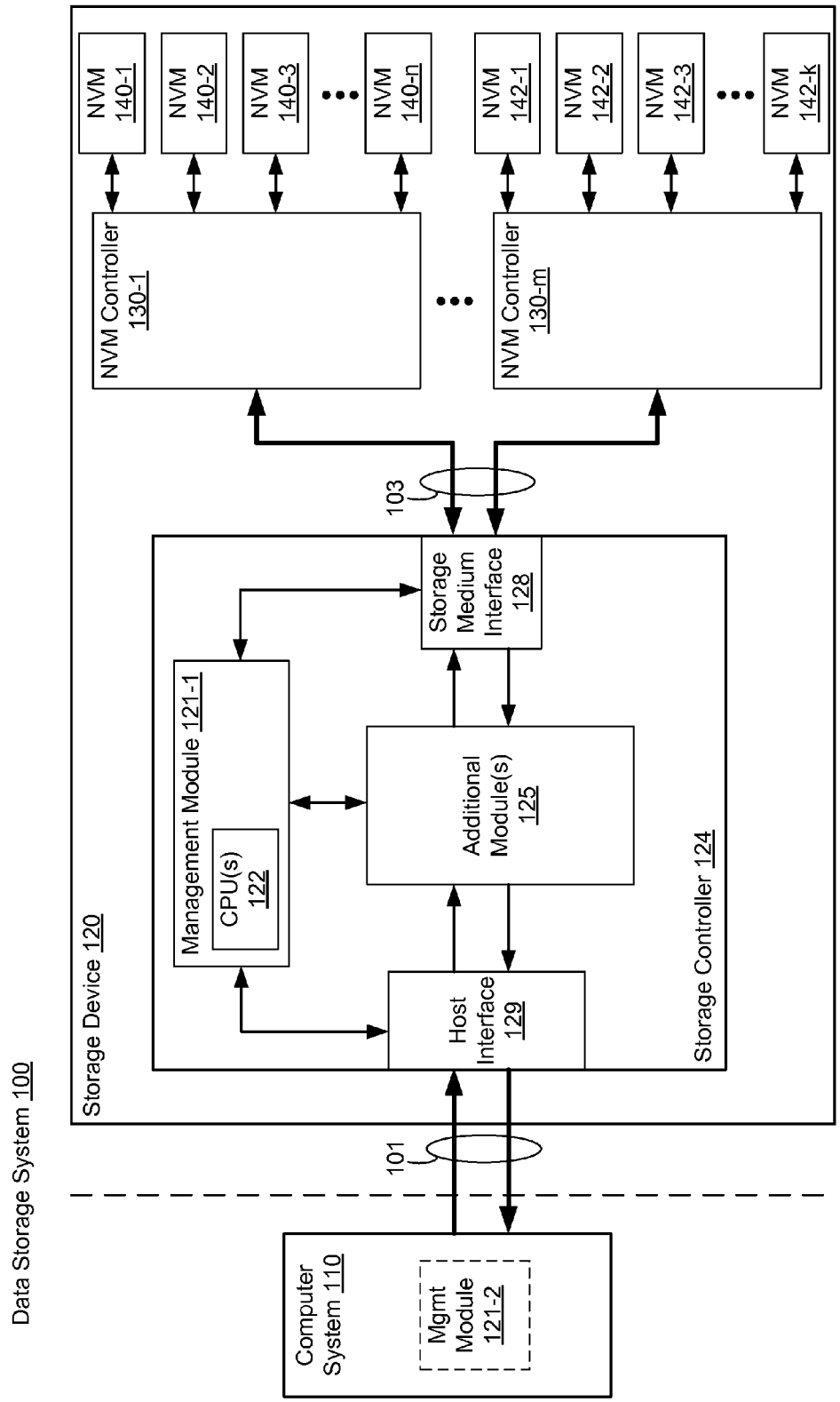
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices that may limit the power consumed by a storage device with one or more memory devices (e.g., storage device 120 with non-volatile memory (NVM) devices 140, 142, FIG. 1).

(A1) More specifically, some embodiments include a method of managing a storage system. In some embodiments, the method includes maintaining a first credit pool and a second credit pool distinct from the first credit pool. The method includes receiving, from a host to which a storage device of the storage system is operatively coupled, a request to perform a respective memory operation (sometimes called a "first memory operation") on one or more memory devices of the storage device. The method includes determining a count of credits corresponding to the respective memory operation. In accordance with a first determination that a current count of credits in the first credit pool is greater than or equal to the count of credits corresponding to the respective memory operation and a second determination that a current count of credits in the second credit pool is greater than or equal to the count of credits corresponding to the respective memory operation, the method includes: performing the respective memory operation; and decrementing the first credit pool and the second credit pool according to the count of credits corresponding to the respective memory operation.

(A2) In some embodiments of the method of A1, an initial value for the first credit pool is calculated based on a baseline memory operation, a first predetermined time period, and a first predetermined maximum power.

(A3) In some embodiments of the method of A2, an initial value for the second credit pool is calculated based on a baseline memory operation, a second predetermined time period, and a second predetermined maximum power, and the initial value for the second credit pool includes a greater number of credits than the initial value for the first credit pool.

(A4) In some embodiments of the method of any of A2 to A3, the baseline memory operation is a lower-page read of a single-level cell (SLC) memory cell of the one or more memory devices.

(A5) In some embodiments of the method of any of A1 to A4, the method further includes replenishing the first credit pool according to a first maximum value for the first credit pool in accordance with a determination that the first predetermined time period has elapsed and replenishing the second credit pool according to a second maximum value for the second credit pool in accordance with a determination that the second predetermined time period has elapsed.

(A6) In some embodiments of the method of any of A1 to A5, the method further includes, in accordance with a determination that the current count of credits in the first credit pool is less than the count of credits corresponding to the respective memory operation and a determination that a current count of credits in the second credit pool is less than the count of credits corresponding to the respective memory operation: forgoing performance of the respective memory operation; and adding the respective memory operation to a deferred operation queue.

(A7) In some embodiments of the method of any of A1 to A6, the method further includes determining a current power consumption value, and, in accordance with a determination that the current power consumption value is greater than a predetermined maximum power consumption value, reducing a first maximum value for the first credit pool and a second maximum value for the second credit pool according to a difference between the current power consumption value and the predetermined maximum power consumption value.

(A8) In some embodiments of the method of any of A1 to A7, the method further includes determining the current power consumption value and, in accordance with a determination that the current power consumption value is less than a predetermined maximum power consumption value, increasing a first maximum value for the first credit pool and a second maximum value for the second credit pool according to a difference between the current power consumption value and the predetermined maximum power consumption value.

(A9) In some embodiments of the method of any of A7 to A8, the current power consumption value corresponds to the power consumed by the storage system.

(A10) In some embodiments of the method of any of A2-A3 and A7 to A8, the current power consumption value is determined according to a predetermined periodic power monitoring period, and the predetermined periodic power monitoring period is shorter than the first predetermined time period and the second predetermined time period.

(A11) In some embodiments of the method of any of A1 to A10, the one or more memory devices comprise one or more flash memory devices.

(A12) In another aspect, a storage device includes non-volatile memory, and a storage controller having one or more processors configured to execute instructions in one or more programs, where the storage controller is configured to perform or control performance of any of the methods A1 to A11 described herein.

(A13) In some embodiments of the storage device of A11, the storage controller includes one or more credit modules to maintain the first credit pool and second credit pool update the count of credits in the first credit pool and the count of credits in the second credit pool, and a power monitoring module to monitor power consumption by the storage device.

(A14) In yet another aspect, any of the methods A1 to A11 described above are performed by a storage device including means for performing or controlling performance of any of the methods described herein.

(A15) In yet another aspect, a storage system includes (1) a storage medium (e.g., comprising one or more non-volatile storage devices, such as flash memory devices), (2) one or more processors, and (3) memory (e.g., non-volatile memory or volatile memory in the storage system) storing one or more programs, which when executed by the one or more processors cause the storage system to perform or control performance of any of the methods A1 to A11 described herein.

(A16) In yet another aspect, some embodiments include a non-transitory computer readable storage medium, storing one or more programs configured for execution by one or more processors of a storage device, the one or more programs including instructions for performing or controlling performance of any of the methods A1 to A11 described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes storage device 120 (also sometimes called an information storage device, or a data storage device, or a memory device), which includes storage controller 124, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage device 120 (e.g., including storage controller 124, the one or more NVM controllers 130, and NVM devices 140, 142) is embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-$n$, and NVM devices 142-1 through 142-$k$) and NVM controllers 130 (e.g., NVM controllers 130-1 through 130-$m$). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16, or 32. In another non-limiting example, the number of NVM devices 140 or 142 per memory channel is typically 8, 16, 32, or 64. Furthermore, in some embodiments, the number of NVM devices 140/142 is different in different memory channels.

In some embodiments, each NVM controller of NVM controllers 130 include one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units 122 (CPUs, also sometimes called processors or microprocessors or microcontrollers) configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). In some embodiments, management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error-correcting code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error-correcting code. Those skilled in the art will appreciate that various error-correcting codes have different error detection and correction capacities, and that particular codes are selected for various applications for reasons beyond the scope of this disclosure. As such, an exhaustive review of the various types of error-correcting codes is not provided herein. Moreover, those skilled in the art will appreciate that each type or family of error-correcting codes may have encoding and decoding algorithms that are particular to the type or family of error-correcting codes. On the other hand, some algorithms may be utilized at least to some extent in the decoding of a number of different types or families of error-correcting codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142 (e.g., through NVM controllers 130), via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
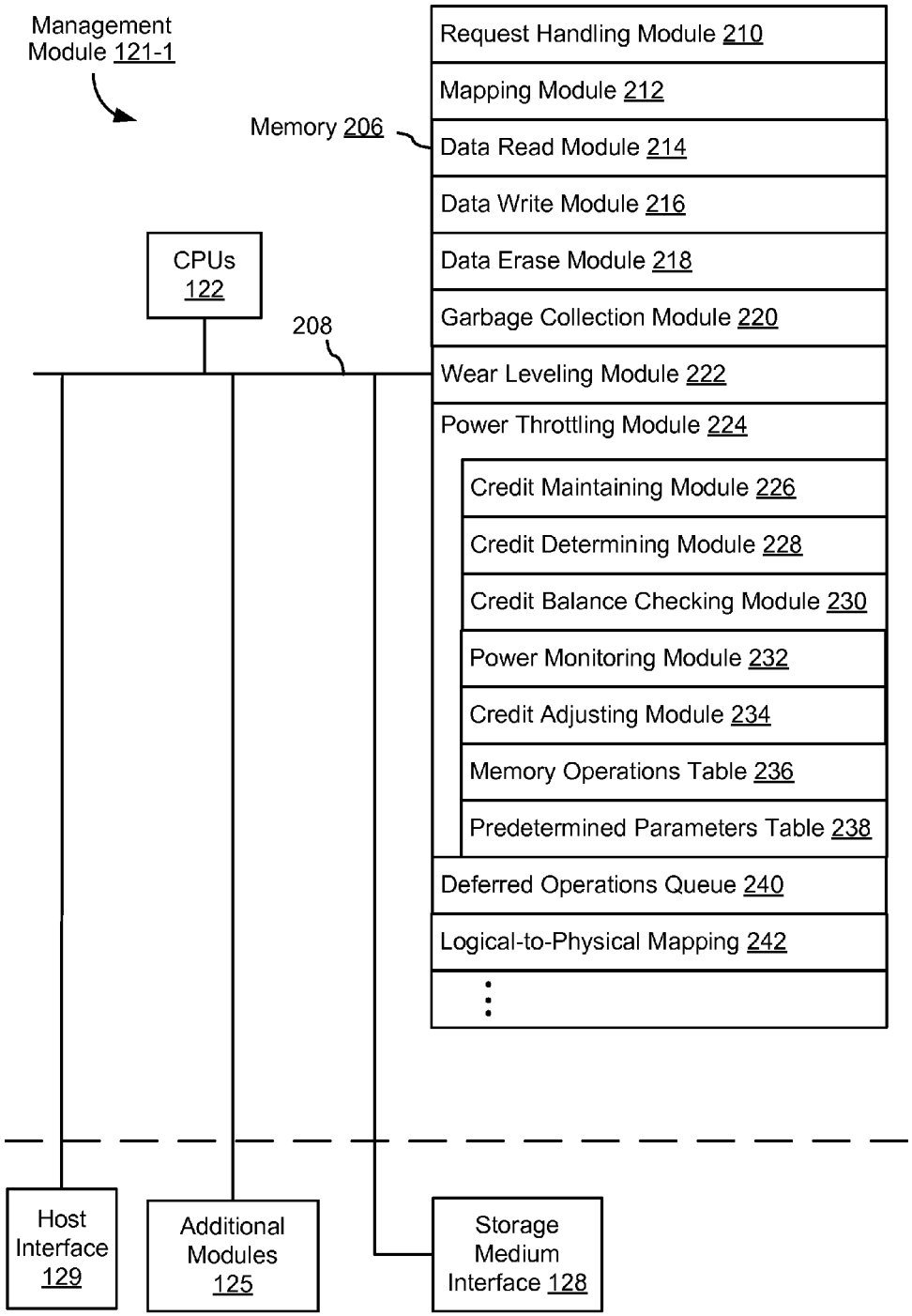
FIG. 2 is a block diagram of an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122 for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium interface 128 by the one or more communication buses 208. Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- request handling module 210 for receiving input/output (I/O) requests from a host (e.g., write requests and/or read requests);
- mapping module 212 for mapping logical addresses to physical addresses using logical-to-physical mapping 242;
- data read module 214 data for reading data, or causing data to be read, from storage device 120 (e.g., NVM devices 140, 142);
- data write module 216 writing data, or causing data to be written, to storage device 120 (e.g., NVM devices 140, 142);
- data erase module 218 for erasing data, or causing data to be erased, from storage device 120 (e.g., NVM devices 140, 142);
- garbage collection module 220 for performing a garbage collection process on one or more memory portions (i.e., blocks) of storage device 120 (e.g., NVM devices 140, 142);
- wear leveling module 222 for optimally determining memory portions (i.e., pages or blocks) of storage device 120 (e.g., NVM devices 140, 142) for storing data so as to evenly wear the memory portions of storage device 120 (e.g., NVM devices 140, 142);
- power throttling module 224 for limiting the power consumption of storage device 120, including but not limited to:
    - credit maintaining module 226 for maintaining and replenishing a first credit pool (e.g., a peak power credit pool) and a second credit pool (e.g., an average power credit pool);
    - credit determining module 228 for determining a count of credits for a respective memory operation (e.g., a read, write, or erase operation) based on the respective memory operation and memory operations table 236;
    - credit balance checking module 230 for determining whether the balances of the first credit pool and the second credit pool are greater than or equal to the count of credits for the respective memory operation determined by credit determining module 228;
    - power monitoring module 232 for monitoring the power consumption of storage device 120;
    - credit adjusting module 234 for adjusting a first maximum value for the first credit pool and a second maximum value for the second credit pool according to a difference between the current power consumption value and the predetermined maximum power consumption value in accordance with a determination that the power consumption value exceeds or is less than a predetermined maximum power consumption value;
    - memory operations table 236 storing predefined credit counts for various memory operations; and
    - predetermined parameters table 238 storing a plurality of predetermined parameters such as a predetermined maximum power consumption value, a set of parameters for determining an initial value of the first credit pool, and a set of parameters for determining an initial value of the second credit pool;
- deferred operation queue 240 storing deferred memory operations, where the deferred operation queue 240 includes the respective memory operation in accordance with a determination by credit balance checking module 230 that the balance of the first credit pool or the balance of the second credit pool is less than the count of credits for the respective memory operation; and
- logical-to-physical mapping 242 storing a logical-to-physical map (used, for example, by mapping module 212), which maps logical addresses recognized by the host (e.g., computer system 110, FIG. 1) to physical addresses of storage device 120 (e.g., NVM devices 140, 142).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows a management module 121-1, FIG. 2 is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of management module 121-1 may instead be performed and/or implemented by management module 121-2. In some embodiments, one or more of the operations and/or modules of management module 121-1 may instead be performed and/or implemented by NVM controllers 130. For example, each NVM controller includes power throttling logic (e.g., similar to power throttling module 224, FIG. 2) for limiting the power consumption of corresponding NVM devices. In some embodiments, power throttling module 224 may be implemented in whole or in part by software, hardware, firmware, or any combination thereof in data storage system 100 (FIG. 1).

Figure 3A:
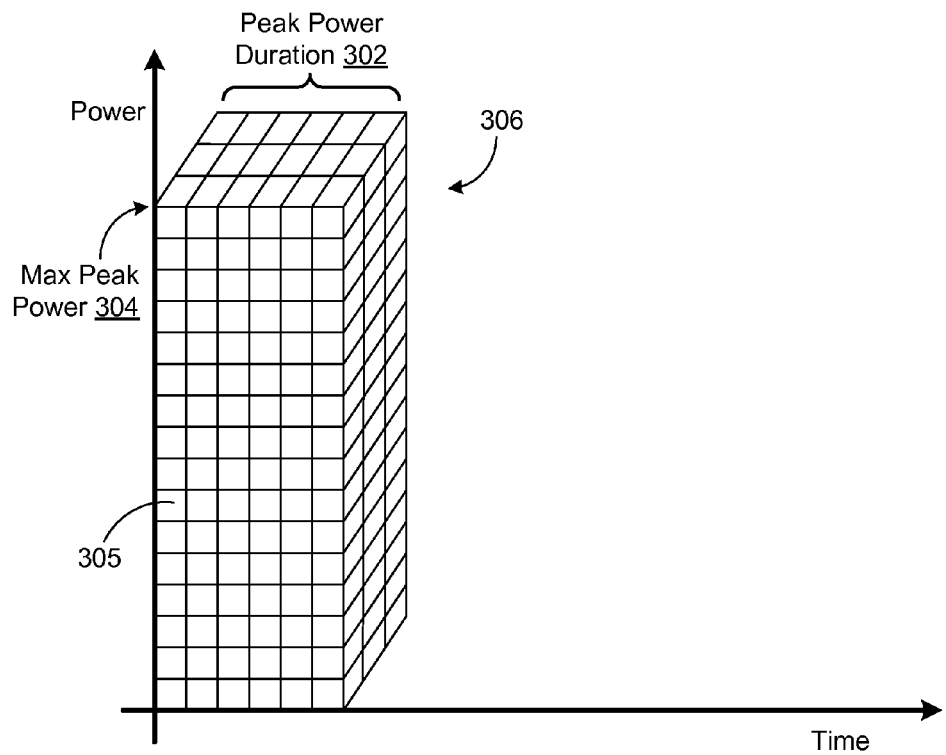
FIG. 3A is a prophetic diagram of a first credit pool corresponding to a set of peak power parameters, in accordance with some embodiments.
Figure 3B:
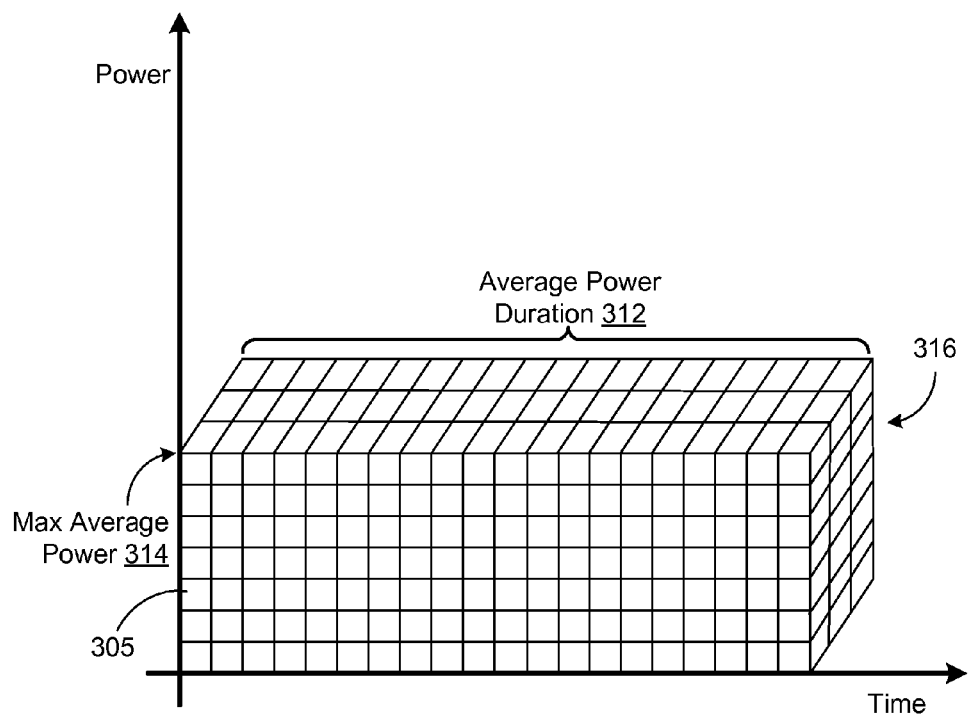
FIG. 3B is a prophetic diagram of a second credit pool corresponding to a set of average power parameters, in accordance with some embodiments.

FIG. 3A is a prophetic diagram of a first credit pool corresponding to a set of peak power parameters, in accordance with some embodiments. Prism 306 in FIG. 3A represents the maximum amount of power that the storage system will allow to be consumed by the execution of memory operations during each successive time period having a first duration, labeled the peak power duration 302 in FIG. 3A, as explained in more detail below. FIG. 3B is a prophetic diagram of a second credit pool corresponding to a set of average power parameters, in accordance with some embodiments. Prism 316 in FIG. 3B represents the maximum amount of power that the storage system will allow to be consumed by the execution of memory operations during each successive time period having a second duration, labeled the average power duration 312 in FIG. 3B, as explained in more detail below.

Figure 4A:
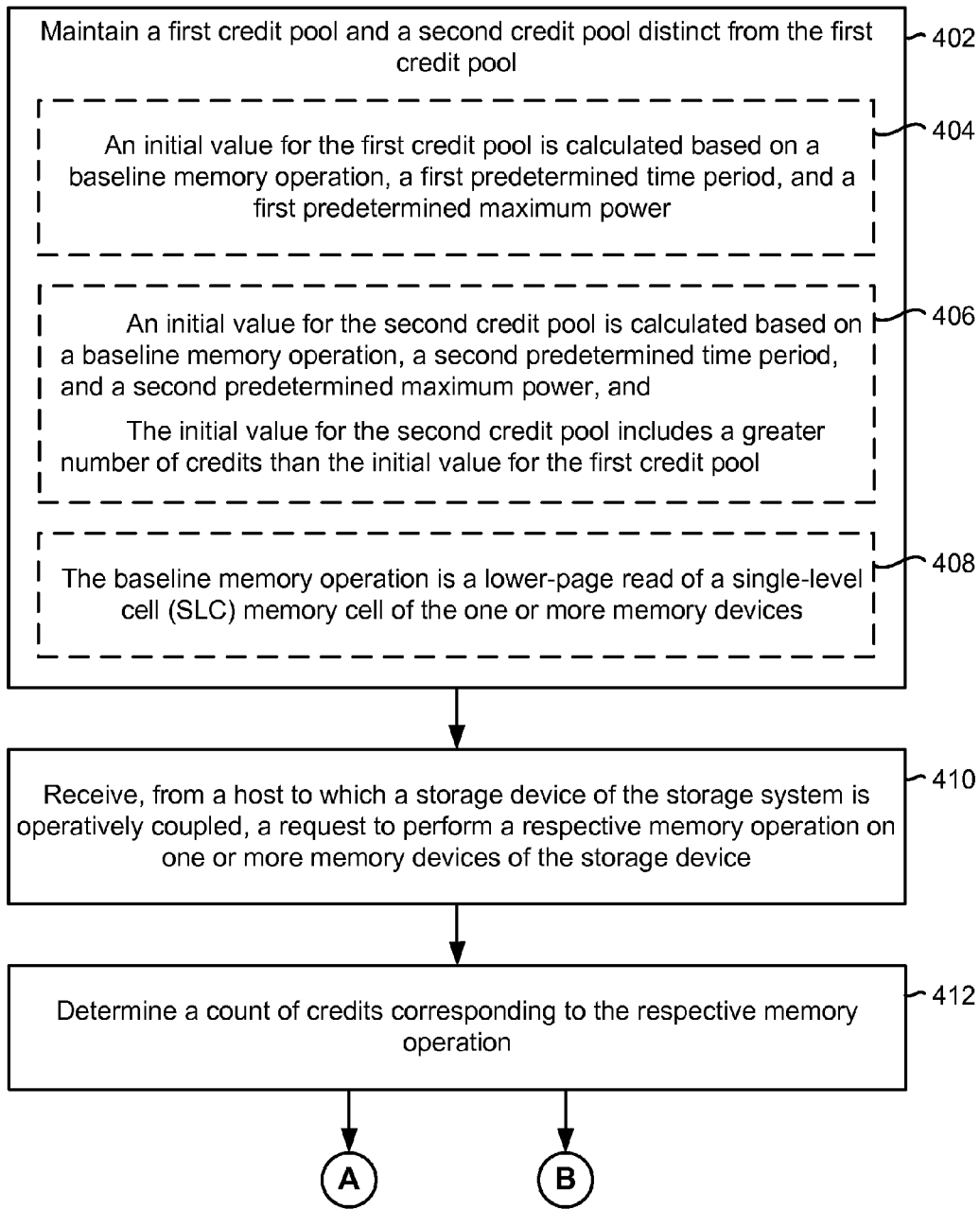
FIGS. 4A-4C illustrate a flowchart diagram of a method of managing a storage system, in accordance with some embodiments.
Figure 4B:
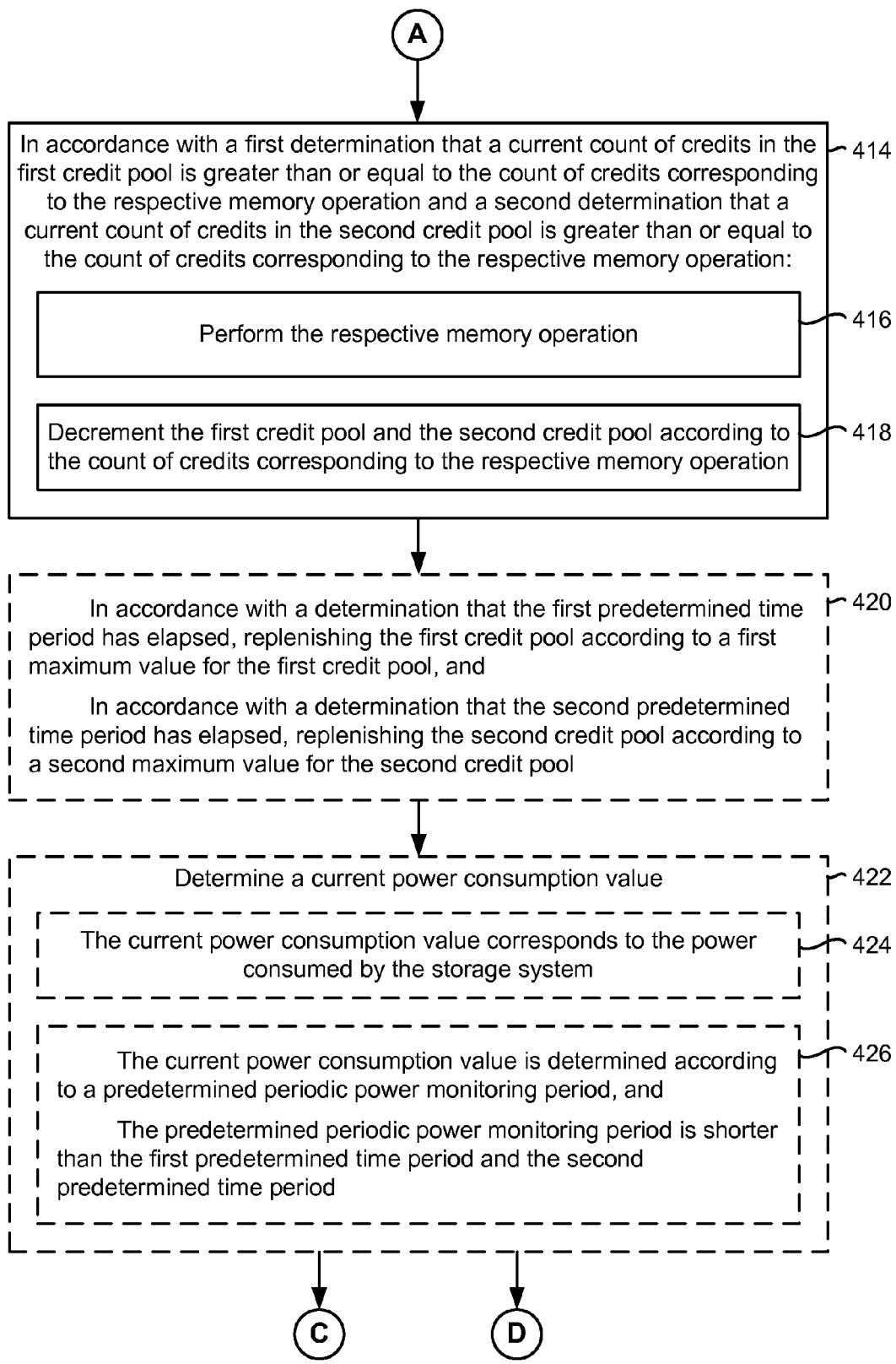
Figure 4C:
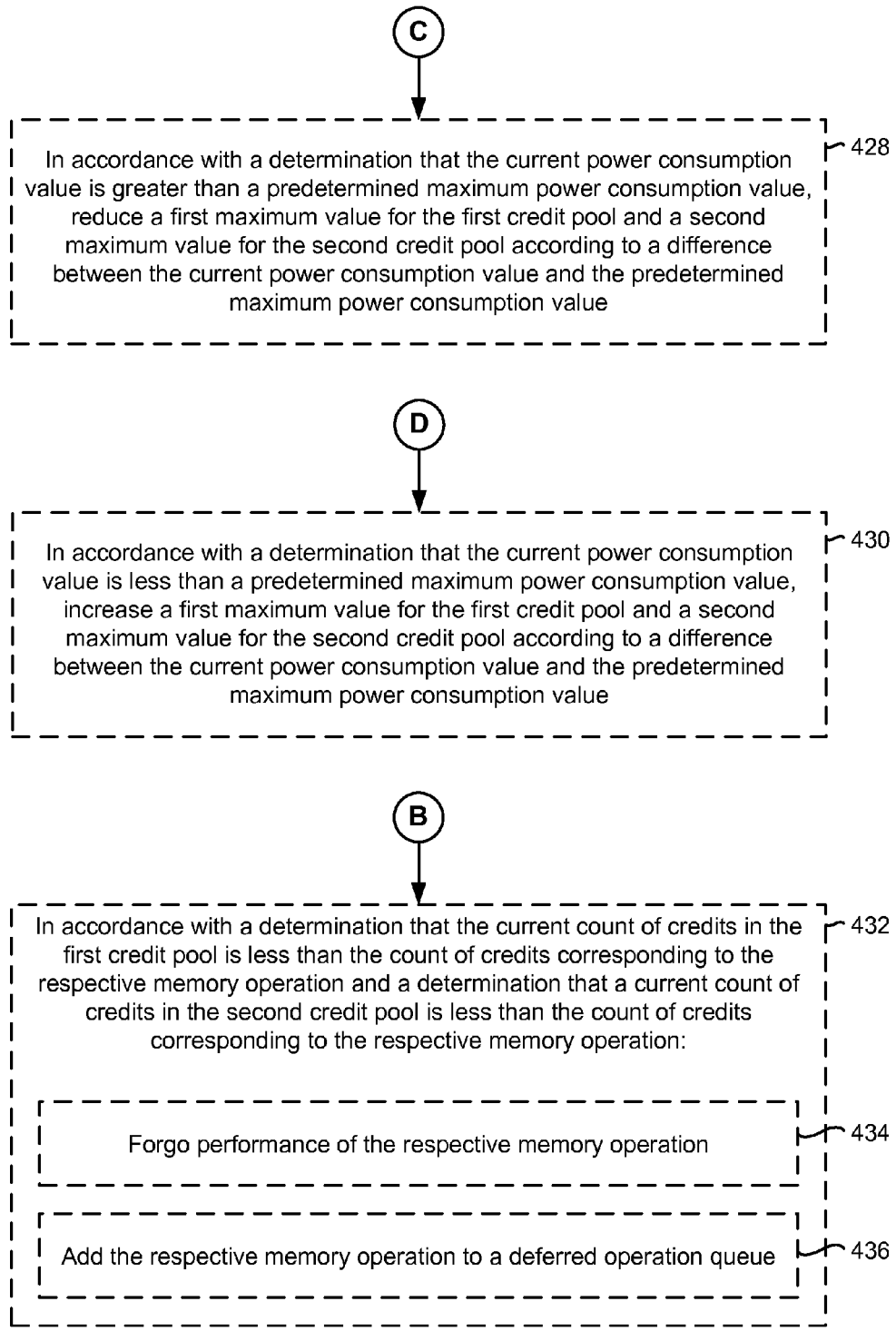

FIGS. 4A-4C illustrate a flowchart diagram of a method of managing a storage system, in accordance with some embodiments. In some embodiments, method 400 is performed by at least in part by a storage device (e.g., storage device 120, FIG. 1) of the storage system (e.g., data storage system 100, FIG. 1) with one or more processors and memory, where the storage device is operatively coupled with a host (e.g., computer system 110, FIG. 1) and the storage device includes one or more memory devices (e.g., NVM devices 140, 142, such as flash memory devices). For example, in some embodiments, method 400 is performed by storage controller 124 (FIG. 1) or a component thereof (e.g., management module 121-1, FIGS. 1-2). In another example, in some embodiments, method 400 is performed by computer system 110 (FIG. 1) or a component thereof (e.g., management module 121-2, FIG. 1). In yet another example, in some embodiments, method 400 is performed by a respective NVM controller 130 (FIG. 1) or a component thereof (e.g., power throttling logic). In some embodiments, method 400 is governed by instructions that are stored in a non-transitory computer readable storage medium (e.g., memory 206, FIG. 2) and the instructions are executed by one or more processors of the storage device (e.g., CPUs 122, FIGS. 1-2). Optional operations are indicated by dashed lines (e.g., boxes with dashed-line borders).

The storage device maintains (402) a first credit pool and a second credit pool distinct from the first credit pool. In some embodiments, storage controller 124 or a component thereof (e.g., credit maintaining module 226, FIG. 2) maintains a first credit pool (e.g., corresponding to a set of predetermined peak power parameters) and a second credit pool (e.g., corresponding to a set of predetermined average power parameters).

In some embodiments, an initial value for the first credit pool is calculated (404) based on a first predetermined time period and a first predetermined maximum power, or alternatively, a baseline memory operation, the first predetermined time period and the first predetermined maximum power. In some embodiments, the first credit pool corresponds to a set of peak power parameters. In some embodiments, the first time period and the first maximum power are tunable parameters set to match a specified peak power for the storage system. In some embodiments, the first time period and the first maximum power are stored in predetermined parameters table 238. In FIG. 3A, for example, peak power duration 302 is the first time period and max peak power 304 is the first maximum power.

In some embodiments, the initial value for the first credit pool credit pool is determined by: (1) determining a unit credit in mW-μs for a baseline memory operation (e.g., a lower-page read of SLC memory cells); (2) determining total mW-μs for the first credit pool according to first time period*the first maximum power (where * is a symbol representing multiplication of the values before and after the symbol); and (3) dividing the result of (2) by (1). For example, the unit credit is determined according to the following equation, where $V_{die}$ corresponds to the voltage drawn by a respective die of the storage device during the baseline memory operation, $I_{die}$ corresponds to the current drawn by the respective die of the storage device during the baseline memory operation, and $t_{baseline\ memory\ operation}$ corresponds to the estimated time required to complete the baseline memory operation.

$$\text{unit credit} = V_{die} * I_{die} * t_{baseline\ memory\ operation} * 2$$

For example, in FIG. 3A, the first credit pool corresponds to rectangular prism 306 bound by the dimensions of peak power duration 302 and max peak power 304, and the volume of rectangular prism 306 is equal to the result of (2). The volume of rectangular prism 306 (e.g., the result of (2)) is divided into unit credits 305 (e.g., the result of (1)) to produce the initial value of the first credit pool (e.g., the result of (3)).

In some embodiments, an initial value for the second credit pool is calculated (406) based on a second predetermined time period and a second predetermined maximum power; or alternatively, a baseline memory operation, the second predetermined time period, and the second predetermined maximum power; and the initial value for the second credit pool includes a greater number of credits than the initial value for the first credit pool. In some embodiments, the second credit pool corresponds to a set of average power parameters. In some embodiments, the second time period and the second maximum power are tunable parameters set to match a specified average power for the storage system. In some embodiments, the second time period and the second maximum power are stored in predetermined parameters table 238. In FIG. 3B, for example, average power duration 312 is the second time period and max average power 314 is the second maximum power.

In some embodiments, the initial value for the second credit pool credit pool is determined by: (1) determining a unit credit in mW-µs for a baseline memory operation (e.g., a lower-page read of SLC memory cells); (4) determining total mW-µs for the second credit pool according to the second time period*the second maximum power (where * is a symbol representing multiplication of the values before and after the symbol); and (5) dividing the result of (4) by (1). For example, the unit credit is determined according to the equation above.

For example, in FIG. 3B, the second credit pool corresponds to rectangular prism 316 bound by the dimensions of average power duration 312 and max average power 314, and the volume of rectangular prism 316 is equal to the result of (2). The volume of rectangular prism 306 (e.g., the result of (4)) is divided into unit credits 305 (e.g., the result of (1)) to produce the initial value of the first credit pool (e.g., the result of (5)). In some embodiments, the maximum peak power 304 exceeds the maximum average power 314 by no more than 20%, or 30%, or 40%, or 50%, depending on the implementation. In some embodiments, the maximum peak power 304 and maximum average power 314 are RMS (root mean square) values.

In some embodiments, the baseline memory operation is (408) a lower-page read of a single-level cell (SLC) memory cell of the one or more memory devices. In some embodiments, the baseline memory operation is a memory operation type that requires the least amount of time to complete.

The storage device receives (410), from a host to which the storage device of the storage system is operatively coupled, a request to perform a respective memory operation on the one or more memory devices of the storage device. In some embodiments, the storage device (e.g., storage device 120, FIG. 1) comprises a storage controller (e.g., storage controller 124, FIG. 1) and the one or more memory devices (e.g., NVM devices 140, 142, FIG. 1). Optionally, but typically, each memory device includes a plurality of memory portions such as die, blocks, pages, etc. In some embodiments, the storage device is embedded in the host. In some embodiments, storage controller 124 or a component thereof (e.g., request handling module 210, FIG. 2) receives a request from a host (e.g., a process internal to storage device 120 or computer system 110 (FIG. 1) external to storage device 120) to perform a memory operation (e.g., a read, write, or erase operation) on NVM devices 140, 142.

The storage device determines (412) a count of credits corresponding to the respective memory operation. In some embodiments, a weight (in unit credits) is assigned to respective memory operation types based on an estimated completion time for the memory operation type (e.g., an estimate based on the average completion time for memory operations of the respective type). For example, in accordance with some embodiments, the fastest memory operation type (e.g., the baseline memory operation) is assigned a weight of one and all other memory operation types are assigned integer multiples of the weight based on their respective completion times relative to the completion time of the fastest memory operation type. In some embodiments, the assigned weights are based on an estimate of the power consumed during execution of a memory operation of the corresponding operation type. In some embodiments, the assigned weights are based on an average power consumed during execution of a memory operation of the corresponding operation type.

As a non-limiting example, Table 1, below, shows various memory operation types, each with a respective estimated completion time and a respective assigned weight.

TABLE 1

| Memory Operation Type | Estimated Completion Time | Assigned Weight (unit credits) |
| --- | --- | --- |
| SLC Read | 36 µs | 1 |
| SLC Write | 323 µs | 9 |
| SLC Erase | 2716 µs | 76 |
| MLC LP Read | 36 µs | 1 |
| MLC UP Read | 51 µs | 2 |
| MLC LP Write | 432 µs | 12 |
| MLC UP Write | 2100 µs | 64 |
| MLC Erase | 3372 µs | 106 |

As shown in Table 1, a single-level cell (SLC) read takes an estimated 36 µs to complete and is thus the fastest memory operation type and is assigned a weight of one. A multi-level cell (MLC) lower page (LP) read also takes an estimated 36 µs to complete and is therefore also assigned a weight of one. An MLC upper page (UP) read takes an estimated 51 µs to complete and is therefore assigned a weight of two. An MLC erase takes an estimated 3372 µs to complete and is therefore assigned a weight of 106. In some embodiments, the assigned weights are stored in memory operation table 236. In some embodiments, storage controller 124 or a component thereof (e.g., credit determining module 228, FIG. 2) determines a count of credits (or a weight in unit credits) for the respective memory operation (e.g., a read, write, or erase operation) based on the respective memory operation and memory operations table 236 which includes Table 1.

In accordance with (414) a first determination that a current count of credits in the first credit pool is greater than or equal to the count of credits corresponding to the respective memory operation and a second determination that a current count of credits in the second credit pool is greater than or equal to the count of credits corresponding to the respective memory operation, the storage device: performs (416) the respective memory operation; and decrements (418) the first credit pool and the second credit pool according to the count of credits corresponding to the respective memory operation. In some embodiments, storage controller 124 or a component thereof (e.g., credit balance checking module 230, FIG. 2) determines whether the balances of the first and second credit pools include a number of credits greater than or equal to the count of credits for the respective memory operation (e.g., determined in operation 412). In accordance with a determination that the balances of the first and second credit pools include a number of credits greater than or equal to the count of credits for the respective memory operation, storage controller 124 or a component thereof (e.g., data read module 214, FIG. 2; data write module 216, FIG. 2; or data erase module 218, FIG. 2) performs the respective memory operation, and storage controller 124 or a component thereof (e.g., credit maintaining module 226, FIG. 2) decrements the balances of the first and second credit pools according to the count of credits for the respective memory operation (e.g., determined in operation 412). The credits pools corresponding to peak power and average power pools must both have a sufficient balance of credits to perform the memory operation. As such, both peak power and average power are managed according to the predetermined parameters for determining the first and second credit pools stored in predetermined parameters table 238.

In accordance with a determination that the first predetermined time period has elapsed, the storage device replenishes (420) the first credit pool according to a first maximum value for the first credit pool, and, in accordance with a determination that the second predetermined time period has elapsed, the storage device replenishes the second credit pool according to a second maximum value for the second credit pool. In accordance with a determination that the first predetermined time period has elapsed, storage controller 124 or a component thereof (e.g., credit maintaining module 226, FIG. 2) replenishes the first credit pool according to a first maximum value for the first credit pool. In accordance with a determination that the second predetermined time period has elapsed, storage controller 124 or a component thereof (e.g., credit maintaining module 226, FIG. 2) replenishes the second credit pool according to a second maximum value for the second credit pool. For example, the first and second maximum values are the initial values discussed in operations 404-406. In another example, the first and second maximum values are greater or less than the initial values according to operations 428-430.

In some embodiments, the storage device determines (422) a current power consumption value. In some embodiments, storage controller 124 or a component thereof (e.g., power monitoring module 232, FIG. 2) monitors the power consumption of storage device 120. For example, power monitoring module 232 monitors the average (e.g., RMS) or instantaneous power consumed by storage controller 124, NVM controllers 130, NVM devices 140, 142, and other processes so as to obtain the current power consumption corresponding to the total power drawn by the storage device.

In some embodiments, the current power consumption value corresponds to (424) the power consumed by the storage system. In some embodiments, storage controller 124 or a component thereof (e.g., power monitoring module 232, FIG. 2) monitors the overall power consumption of data storage system 100.

In some embodiments, the current power consumption value is determined (426) according to a predetermined periodic power monitoring period, and the predetermined periodic power monitoring period is shorter than the first predetermined time period and the second predetermined time period. In some embodiments, storage controller 124 or a component thereof (e.g., power monitoring module 232, FIG. 2) monitors the power consumption of storage device 120 according to a periodic power monitoring period that is shorter than the first predetermined time period (e.g., corresponding to peak power) and the second predetermined time period (e.g., corresponding to average power) to apply feedback over smaller windows of time and reduce the impact of power spikes that cannot be handled within the longer windows of time corresponding to the first and second predetermined time periods.

In accordance with a determination that the current power consumption value (e.g., monitored by power monitoring module 232, FIG. 2) is greater than a predetermined maximum power consumption value (e.g., stored in predetermined parameters table 238), the storage controller or a component thereof (e.g., credit adjusting module 234, FIG. 2) reduces (428) a first maximum value for the first credit pool and a second maximum value for the second credit pool according to a difference between the current power consumption value and the predetermined maximum power consumption value. For example, if the current power is 13 W and the predetermined maximum power consumption value is 12 W, the maximum initial values for first and second credit pools are both reduced by 1 W worth of credits for a next time period. In some embodiments, if the reduction in the maximum initial values for first and second credit pools overcompensates for the difference between the current power consumption value and the predetermined maximum power consumption value, the maximum initial values for first and second credit pools are later increased for subsequent time periods to even out the power consumption and bring the power consumption closer to the predetermined maximum power consumption value.

In some embodiments, in accordance with a determination that the current power consumption value is less than a predetermined maximum power consumption value (e.g., stored in predetermined parameters table 238), the storage device increases (430) a first maximum value for the first credit pool and a second maximum value for the second credit pool according to a difference between the current power consumption value and the predetermined maximum power consumption value. In some embodiments, the current power consumption value and the predetermined maximum power consumption value are RMS (root mean square) values. In accordance with a determination that the current power consumption value (e.g., monitored by power monitoring module 232, FIG. 2) is less than the predetermined maximum power consumption value (e.g., stored in predetermined parameters table 238), the storage controller or a component thereof (e.g., credit adjusting module 234, FIG. 2) increases a first maximum value for the first credit pool and a second maximum value for the second credit pool according to a difference between the current power consumption value and the predetermined maximum power consumption value. For example, if the current power is 11 W and the max power metric is 12 W, the maximum initial values for first and second credit pools are both increased by 1 W worth of credits for a next time period.

In accordance with a determination (432) that the current count of credits in the first credit pool is less than the count of credits corresponding to the respective memory operation and a determination that a current count of credits in the second credit pool is less than the count of credits corresponding to the respective memory operation, the storage device: forgoes (434) performance of the respective memory operation; and adds (436) the respective memory operation to a deferred operation queue. In some embodiments, storage controller 124 or a component thereof (e.g., credit balance checking module 230, FIG. 2) determines whether the balances of the first and second credit pools include a number of credits greater than or equal to the count of credits for the respective memory operation (e.g., determined in operation 412). In accordance with a determination that the balance of either the first or second credit pool is less than the count of credits for the respective memory operation, storage controller 124 or a component thereof forgoes performance of the respective memory operation and adds the respective memory operation to deferred operation queue 240. In some embodiments, memory operations in the deferred operation queue 240 are performed on a first-in-first-out basis when the balances of the first and second credit pools are sufficient.

It should be understood that the particular order in which the operations in FIGS. 4A-4C have been described is merely exemplary and is not intended to indicate that the described order is the only order in which the operations could be performed. One of ordinary skill in the art would recognize various ways to reorder the operations described herein.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B, and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing power usage in a storage system, the method comprising:
   maintaining a first credit pool having a first maximum power value and a first time period corresponding to a peak power usage limit for the storage system;
   maintaining a second credit pool, distinct from the first credit pool, the second credit pool having a second maximum power value and a second time period corresponding to an average power usage limit for the storage system, wherein the second time period is longer than the first time period;
   receiving, from a host, a request to perform a first memory operation on one or more memory devices of the storage system;
   determining a count of credits corresponding to the first memory operation;
   performing the first memory operation;
   decrementing the first credit pool according to the count of credits corresponding to the first memory operation;
   decrementing the second credit pool according to the count of credits corresponding to the first memory operation;
   in accordance with a determination that the first time period has elapsed, replenishing the first credit pool according to the first maximum power value; and
   in accordance with a determination that the second time period has elapsed, replenishing the second credit pool according to the second maximum power value.

2. The method of claim 1, wherein an initial value for the first credit pool is calculated based on at least one of: a baseline memory operation, a first time period, and a first predetelined maximum power.

3. The method of claim 1, wherein:
   an initial value for the second credit pool is calculated based on at least one of: a baseline memory operation, a second time period, and a second predetermined maximum power; and
   the initial value for the second credit pool includes a greater number of credits than the initial value for the first credit pool.

4. The method of claim 1, further comprising:
   in accordance with a determination that the current count of credits in the first credit pool is less than the count of credits corresponding to the first memory operation or a determination that a current count of credits in the second credit pool is less than the count of credits corresponding to the first memory operation:
   forgoing performance of the first memory operation; and
   adding the first memory operation to a deferred operation queue.

5. The method of claim 1, further comprising:
   determining a current power consumption value; and
   in accordance with a determination that the current power consumption value is greater than a predetermined maximum power consumption value, reducing a first maximum value for the first credit pool and a second maximum value for the second credit pool according to a difference between the current power consumption value and the predetermined maximum power consumption value.

6. The method of claim 5, further comprising:
   in accordance with a determination that the current power consumption value is less than the predetermined maximum power consumption value, increasing a first maximum value for the first credit pool and a second maximum value for the second credit pool according to a difference between the current power consumption value and the predetermined maximum power consumption value.

7. The method of claim 6, wherein:
   the current power consumption value is determined according to a periodic power monitoring period; and the periodic power monitoring period is shorter than the first time period and the second time period.

8. A storage system, comprising:
non-volatile memory; and
a storage controller having one or more processors configured to execute instructions in one or more programs;
wherein the storage controller is configured to perform operations comprising:
maintaining a first credit pool having a first maximum power value and a first time period corresponding to a peak power usage limit for the storage system;
maintaining a second credit pool, distinct from the first credit pool, the second credit pool having a second maximum power value and a second time period corresponding to an average power usage limit for the storage system;
receiving, from a host, a request to perform a first memory operation on the non-volatile memory;
determining a count of credits corresponding to the first memory operation; and
performing the first memory operation;
decrementing the first credit pool according to the count of credits corresponding to the first memory operation;
decrementing the second credit pool according to the count of credits corresponding to the first memory operation;
in accordance with a determination that the first time period has elapsed, replenishing the first credit pool according to the first maximum power value; and
in accordance with a determination that the second time period has elapsed, replenishing the second credit pool according to the second maximum power value.

9. The storage system of claim 8, wherein the storage controller includes:
one or more credit modules to maintain the first credit pool and second credit pool and update the count of credits in the first credit pool and the count of credits in the second credit pool; and
a power monitoring module to monitor power consumption by the storage system.

10. The storage system of claim 8, wherein an initial value for the first credit pool is calculated based on at least one of: a baseline memory operation, a first time period, and a first predetermined maximum power.

11. The storage system of claim 10, wherein:
an initial value for the second credit pool is calculated based on at least one of: the baseline memory operation, a second time period, and a second predetermined maximum power; and
the initial value for the second credit pool includes a greater number of credits than the initial value for the first credit pool.

12. The storage system of claim 8, wherein the storage controller is further configured to perform operations comprising:
in accordance with a determination that the current count of credits in the first credit pool is less than the count of credits corresponding to the first memory operation or a determination that a current count of credits in the second credit pool is less than the count of credits corresponding to the first memory operation:
forgoing performance of the first memory operation; and
adding the first memory operation to a deferred operation queue.

13. The storage system of claim 8, wherein the storage controller is further configured to perform operations comprising:
determining a current power consumption value; and
in accordance with a determination that the current power consumption value is greater than a predetermined maximum power consumption value, reducing a first maximum value for the first credit pool and a second maximum value for the second credit pool according to a difference between the current power consumption value and the predetermined maximum power consumption value.

14. The storage system of claim 13, wherein the storage controller is further configured to perform operations comprising:
in accordance with a determination that the current power consumption value is less than the predetermined maximum power consumption value, increasing a first maximum value for the first credit pool and a second maximum value for the second credit pool according to a difference between the current power consumption value and the predetermined maximum power consumption value.

15. The storage system of claim 14, wherein:
the current power consumption value is determined according to a predetermined periodic power monitoring period; and
the predetermined periodic power monitoring period is shorter than the first time period and the second time period.

16. A storage system comprising:
means for maintaining a first credit pool and a second credit pool distinct from the first credit pool;
means for maintaining a first credit pool having a first maximum power value and a first time period corresponding to a peak power usage limit for the storage system;
means for maintaining a second credit pool, distinct from the first credit pool, the second credit pool having a second maximum power value and a second time period corresponding to an average power usage limit for the storage system;
means for receiving, from a host, a request to perform a first memory operation on one or more memory devices of the storage system;
means for determining a count of credits corresponding to the first memory operation; and
means for performing the first memory operation;
means for decrementing the first credit pool according to the count of credits corresponding to the first memory operation;
means for decrementing the second credit pool according to the count of credits corresponding to the first memory operation;
means for in accordance with a determination that the first time period has elapsed, replenishing the first credit pool according to the first maximum power value; and
means for in accordance with a determination that the second time period has elapsed, replenishing the second credit pool according to the second maximum power value.

17. The storage system of claim 16, wherein an initial value for the first credit pool is calculated based on at least one of: a baseline memory operation, a first time period, and a first predetermined maximum power.

18. The storage system of claim 17, wherein:

an initial value for the second credit pool is calculated based on at least one of: the baseline memory operation, a second time period, and a second predetermined maximum power; and the initial value for the second credit pool includes a greater number of credits than the initial value for the first credit pool.

19. The storage system of claim 16 further comprising:

means for in accordance with a determination that the current count of credits in the first credit pool is less than the count of credits corresponding to the first memory operation or a determination that a current count of credits in the second credit pool is less than the count of credits corresponding to the first memory operation:

forgoing performance of the first memory operation; and adding the first memory operation to a deferred operation queue.

20. The storage system of claim 16 further comprising:

means for determining a current power consumption value; and means for in accordance with a determination that the current power consumption value is greater than a predetermined maximum power consumption value, reducing a first maximum value for the first credit pool and a second maximum value for the second credit pool according to a difference between the current power consumption value and the predetermined maximum power consumption value.

21. The storage system of claim 20 further comprising:

means for in accordance with a determination that the current power consumption value is less than the predetermined maximum power consumption value, increasing a first maximum value for the first credit pool and a second maximum value for the second credit pool according to a difference between the current power consumption value and the predetermined maximum power consumption value.

22. The storage system of claim 21, wherein:

the current power consumption value is determined according to a predetermined periodic power monitoring period; and the predetermined periodic power monitoring period is shorter than the first time period and the second time period.

\* \* \* \* \*